United States Patent
Bell

(10) Patent No.: US 11,209,100 B2
(45) Date of Patent: Dec. 28, 2021

(54) VALVE TRIM APPARATUS FOR USE WITH VALVES

(71) Applicant: FISHER CONTROLS INTERNATIONAL LLC, Marshalltown, IA (US)

(72) Inventor: Brandon Wayne Bell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 82 days.

(21) Appl. No.: 16/440,583

(22) Filed: Jun. 13, 2019

(65) Prior Publication Data
US 2020/0393063 A1    Dec. 17, 2020

(51) Int. Cl.
F16K 47/10    (2006.01)
F16K 11/056    (2006.01)
F16K 25/04    (2006.01)

(52) U.S. Cl.
CPC ............ F16K 47/10 (2013.01); F16K 11/056 (2013.01); F16K 25/04 (2013.01)

(58) Field of Classification Search
CPC ......... F16K 47/10; F16K 11/056; F16K 25/04
USPC .............................................. 138/42, 43, 46
See application file for complete search history.

(56) References Cited

U.S. PATENT DOCUMENTS

| | | |
|---|---|---|
| 4,295,493 A | 10/1981 | Bey |
| 4,530,375 A * | 7/1985 | Bey .......................... F16K 5/10 137/625.32 |
| 4,628,961 A | 12/1986 | Lew |
| 4,825,906 A | 5/1989 | Hartman |
| 4,921,014 A | 5/1990 | Tartaglia et al. |
| 5,020,571 A | 6/1991 | Tartaglia et al. |
| 5,070,909 A | 12/1991 | Davenport |
| 5,180,139 A | 1/1993 | Gethmann et al. |
| 5,480,123 A | 1/1996 | Bey |
| 5,680,889 A | 10/1997 | Boger |
| 5,769,122 A | 6/1998 | Baumann et al. |
| 5,937,901 A | 8/1999 | Bey |
| 5,988,586 A | 11/1999 | Boger |

(Continued)

FOREIGN PATENT DOCUMENTS

DE    1094538    12/1960

OTHER PUBLICATIONS

United States Patent and Trademark Office, "Final Office Action," issued in connection with U.S. Appl. No. 16/440,605, dated May 18, 2021, 12 pages.

Institut National De La Propriete Industrielle, "Office Action," dated Sep. 7, 2020 in connection with French Patent Application No. FR2006118, 6 pages. (English summary included).

(Continued)

*Primary Examiner* — Craig M Schneider
*Assistant Examiner* — David R Deal
(74) *Attorney, Agent, or Firm* — Hanley, Flight & Zimmerman, LLC

(57) ABSTRACT

Methods, apparatus, and systems for valve trim apparatus for use with control valves are disclosed. An example apparatus includes a valve body including a fluid flow path between an inlet and an outlet. The example apparatus also includes valve trim positioned in the fluid flow path, the valve trim including a first passageway extending from the inlet to the outlet, the first passageway including a first pressure staged passage and a second pressure staged passage, the second pressure staged passage including a first radial passageway.

18 Claims, 7 Drawing Sheets

(56) References Cited

U.S. PATENT DOCUMENTS

| | | | |
|---|---|---|---|
| 6,026,859 A | 2/2000 | Wears et al. | |
| 6,095,196 A | 8/2000 | McCarty et al. | |
| 6,505,646 B1 | 1/2003 | Singleton | |
| 6,520,209 B1 * | 2/2003 | Lundqvist | F16K 5/0605 137/625.31 |
| 6,926,032 B2 * | 8/2005 | Nawaz | F16K 47/04 137/625.33 |
| 7,073,534 B2 * | 7/2006 | Sawchuk | F15D 1/02 138/39 |
| 7,234,488 B2 * | 6/2007 | Partridge | F16K 5/0605 137/625.32 |
| 8,033,300 B2 | 10/2011 | McCarty | |
| 9,334,886 B2 * | 5/2016 | Sawchuk | G01F 15/00 |
| 9,677,687 B2 * | 6/2017 | Yli-Koski | F16L 55/02781 |
| 9,885,375 B2 * | 2/2018 | Reiss | F15D 1/025 |
| 10,100,947 B2 * | 10/2018 | Gattavari | F16K 5/0605 |
| 10,260,537 B2 * | 4/2019 | Sawchuk | G01F 15/00 |
| 10,794,794 B2 * | 10/2020 | Bowdle | G01M 9/04 |
| 2010/0258193 A1 | 10/2010 | Christenson et al. | |
| 2017/0234440 A1 | 8/2017 | Detmers et al. | |
| 2018/0106383 A1 | 4/2018 | Kuhlman et al. | |
| 2020/0393057 A1 | 12/2020 | McMahon | |

OTHER PUBLICATIONS

United Kingdom Intellectual Patent Office, "Combined Search and Examination Report," issued in connection with British Patent Application No. GB2008516.3, dated Oct. 8, 2020, 7 pages.

Institut National De La Propriete Industrielle, "Office Action," dated Sep. 3, 2020 in connection with French Patent Application No. FR2006040, 4 pages. (English summary included).

United Kingdom Intellectual Patent Office, "Combined Search and Examination Report," issued in connection with British Patent Application No. GB2008504.9, dated Oct. 8, 2020, 5 pages.

United States Patent and Trademark Office, "Non-Final Office Action," issued in connection with U.S. Appl. No. 16/440,605, dated Jul. 8, 2020, 12 pages.

United States Patent and Trademark Office, "Final Office Action," issued in connection with U.S. Appl. No. 16/440,605, dated Nov. 17, 2020, 7 pages.

United States Patent and Trademark Office, "Non-Final Office Action," issued in connection with U.S. Appl. No. 16/440,605, dated Feb. 4, 2021, 11 pages.

United States Patent and Trademark Office, "Notice of Allowance and Fee(s) Due," issued in connection with U.S. Appl. No. 16/440,605, dated Jun. 14, 2021, 10 pages.

* cited by examiner

US 11,209,100 B2

1

VALVE TRIM APPARATUS FOR USE WITH VALVES

FIELD OF THE DISCLOSURE

This disclosure relates generally to process control systems and, more particularly, to valve trim apparatus for use with valves.

BACKGROUND

Process units and/or systems like those used in the oil and gas production industry, refining, petrochemical and other manufacturing facilities typically include significant equipment assets, such as process control devices (e.g., a rotary valve, a sliding stem valve, etc.) to control an industrial process. The condition, health, integrity, and/or performance of such process control devices is essential to the efficiency and/or safety of processing plants.

SUMMARY

An example apparatus includes a valve body including a fluid flow path between an inlet and an outlet. The example apparatus also includes valve trim positioned in the fluid flow path. The valve trim including a first passageway extending from the inlet to the outlet, the first passageway including a first pressure staged passage and a second pressure staged passage, the second pressure staged passage including a first radial passageway.

An example apparatus includes a valve body including a fluid flow path between an inlet and an outlet. A ball positioned in the fluid flow path and operatively coupled to a shaft, the ball to maintain fluid flow between the inlet and the outlet. Valve trim positioned in the fluid flow path, the valve trim including a first passageway extending from a first end of the valve body to a second end of the valve body and a second passageway adjacent the first passageway extending from the first end to the second end, the first passageway fluidly coupled to the second passageway via a radial passageway.

An example apparatus includes valve trim including fluid passageways extending from a first end to a second end, the fluid passageways including respective pressure staged passages that extend along the valve trim. The valve trim having a first diameter proximate the first end to accommodate a first number of the fluid passageways and a second diameter proximate the second end to increase the number of the fluid passageways to greater than the first number.

Figure 1:
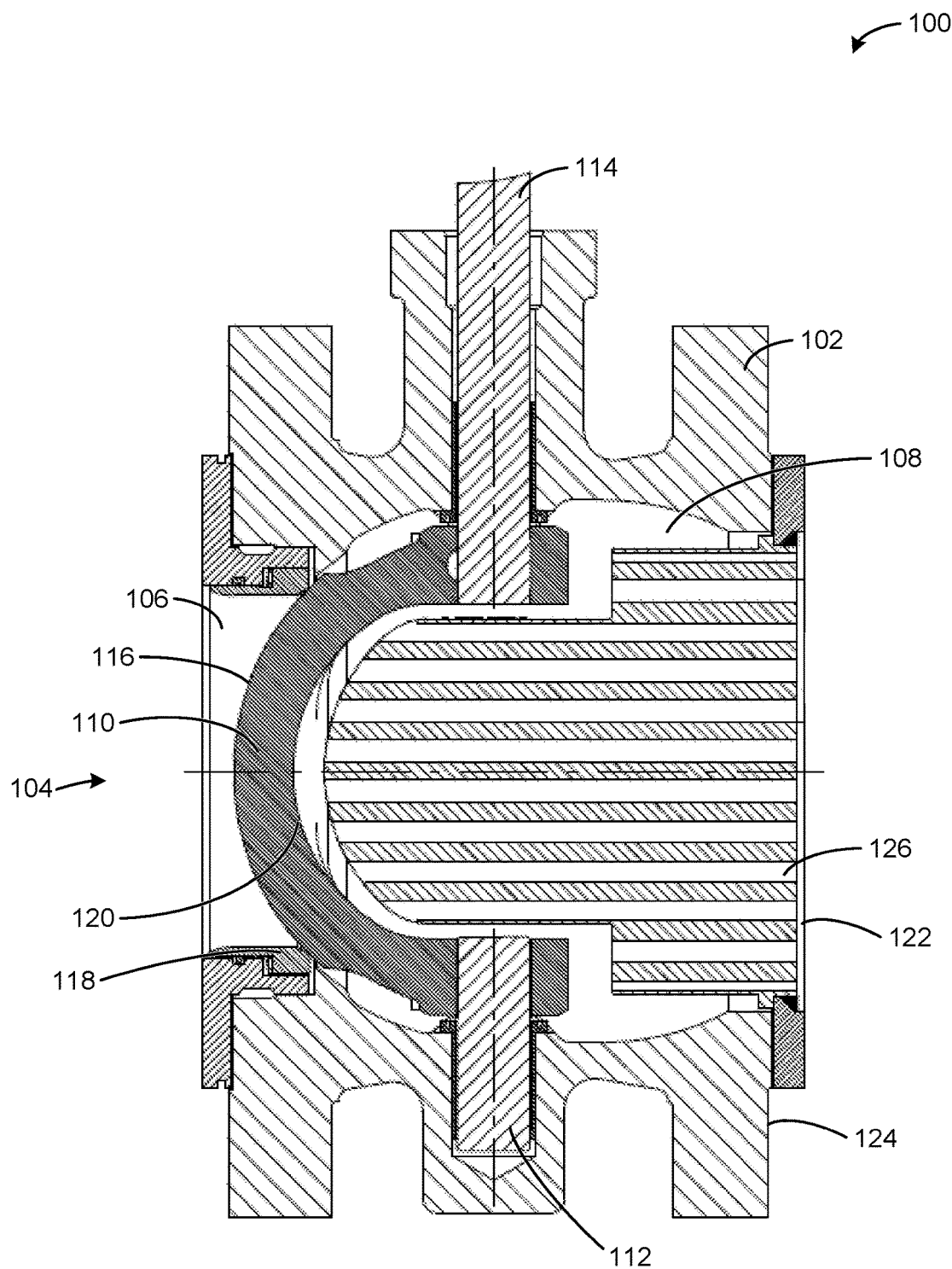
FIG. 1 is a cross-sectional view of a known example rotary valve that may be used to implement examples disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Cavitation is one of the leading causes of failure in control valve components. Cavitation occurs in control valves when there is insufficient pressure within a control valve system to maintain a fluid in a liquid state and/or when a liquid is subjected to rapid changes of pressure that cause the formation of cavities in the liquid where the pressure is relatively low. When the fluid within the control valve system is unable to maintain a liquid state, vapor pockets and/or small bodies of gas contained in the liquid (e.g., bubbles) form within the control valve. The vapor pockets can implode and generate an intense shock wave when subjected to high pressures, which can eventually cause damage to components of the control valve. For example, cavitation may erode material from a valve plug, wear/erode the valve seal(s), and/or damage downstream piping. Such damage to components of the control valve system may result in performance degradation or failure of the control valve. For example, cavitation can decrease flow capability through the control valve, cause material damage to valve trim, a valve body, and/or pipeline, and/or can cause excessive noise and/or vibration. Thus, such control valves are only effective for low pressure drop applications (e.g., pressure drops of less than 50 psi).

Some example control valves produce a substantial decrease in pressure or flow rate of a fluid which, in turn, creates a significant amount of audible noise (e.g., greater than about 85 decibels). Such control valves may employ noise-reduction devices to reduce the volume of audible noise created by the fluid flowing through the pressure regulator, for example.

Examples disclosed herein include an array of fluid passages having a certain shape or geometry. Examples disclosed herein include anti-cavitation and/or pressure staged fluid passages to impart a pressure drop at each stage on fluid passing through the fluid passages. Examples disclosed herein provide valve trim more severe service capability. For example, a valve can be subjected to a higher pressure drop without damage. Examples disclosed herein mitigate the liquid pressure from falling to or below the vapor pressure, thereby eliminating the formation of vapor bubbles.

Examples disclosed herein include radial passageways between each staged recovery volume (e.g., pressure staged passage) to facilitate radial communication of process pressure (e.g., maximizing recovery volume after each staged pressure drop). The radial passageways disclosed herein reduce cavitation by allowing the entire valve trim volume to be utilized while a closure member (e.g., a ball) of a rotary valve is partially closed (e.g., partially preventing fluid from flowing through a portion of the valve trim).

Example valve trim disclosed herein provide certain fluid flow characteristics and/or pressure drop characteristics to reduce cavitation in a control valve. Example fluid control valves implemented with example valve trim apparatus disclosed herein may be employed in relatively high pressure drop applications (e.g., pressure drops of 1000 psi). Such high pressure drop characteristics may be provided by radial passageways of the valve trim apparatus disclosed herein. Thus, example fluid control valves implemented with example valve trim apparatus disclosed herein may reduce a potential for liquid cavitation in high pressure drop applications.

Additionally, example valve trim disclosed herein may include one or more radial passageways to provide desired fluid flow characteristics such as, for example, enhanced pressure recovery, enhanced flow capacity, reduction or elimination of noise and/or cavitation, etc. For example, pressure recovery is a flow characteristic of a fluid passageway that indicates an amount and/or percentage of increase in fluid pressure after a preceding decrease in fluid pressure. In examples in which valve trim may produce a low pressure recovery, fluid pressure downstream from a passageway may be significantly lower than fluid pressure upstream from the passageway. Low pressure recoveries and/or reduced fluid pressure may result in undesired fluid flow characteristics such as, for example, cavitation and/or reduced noise attenuation.

Example valve trim disclosed herein may include restrictions and/or recovery plenums to further provide desired fluid flow characteristics such as, for example, enhanced pressure recovery, enhanced flow capacity, enhanced/reduced fluid velocity, reduction or elimination of noise and/or cavitation, etc. For example, restrictions and/or recovery plenums disclosed herein may vary the velocity of a fluid to provide certain pressure drop characteristics to suit the needs of a particular control application.

FIG. 1 depicts a cross-sectional view of a known rotary valve 100 that may be used to implement the examples disclosed herein. The rotary valve 100 is a ball valve (e.g., Fisher® Vee-Ball™ valve). However, any other rotary valve (e.g., a full ball valve, a segmented ball valve, a butterfly valve, a plug valve, an eccentric plug valve, etc.) may be used to implement the examples disclosed herein. The rotary valve 100 includes a valve body 102 defining a fluid flow path 104 between an inlet 106 and an outlet 108. A flow control member 110 is disposed in the fluid flow path 104. In the illustrated example, the flow control member 110 is a ball. Other examples include different flow control members (e.g., a disk, a plug, etc.). In the illustrated example, the flow control member 110 is in the first, closed position. The flow control member 110 is operatively coupled to a follower shaft 112 and a driveshaft 114. The driveshaft 114 may be coupled to a pneumatic actuator (not shown) such as, for example a Fisher® 2052 Diaphragm Rotary Actuator. The actuator may be a single acting actuator or a double acting actuator. Other example rotary valves may be used to implement the examples disclosed herein such as, for example, a hydraulic actuator or an electric actuator.

The flow control member 110 of the illustrated example includes a convex surface 116 to sealingly engage a valve seat 118 to prevent fluid flow between the inlet 106 and the outlet 108. In the illustrated example, the flow control member 110 includes a concave surface 120 to allow fluid flow between the inlet 106 and the outlet 108 when the flow control member 110 is in an open position. The example rotary valve 100 includes valve trim 122 positioned in the fluid flow path 104 adjacent a first surface 124. The valve trim 122 includes fluid flow passageways 126 to reduce cavitation when fluid flows between the inlet 106 and the outlet 108.

Figure 2A:
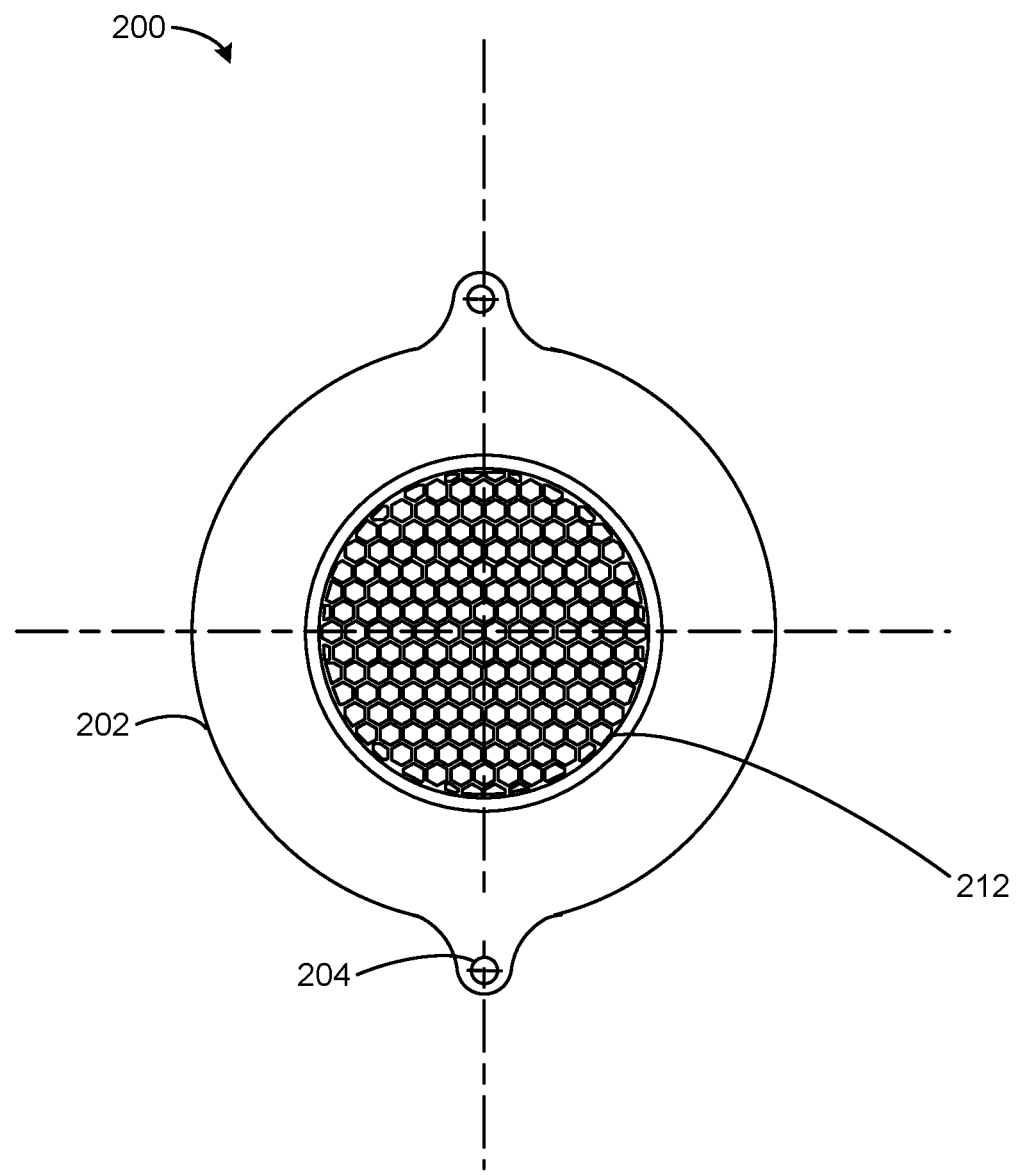
FIGS. 2A-2B are an example valve trim constructed in accordance with teachings of this disclosure.
Figure 2B:
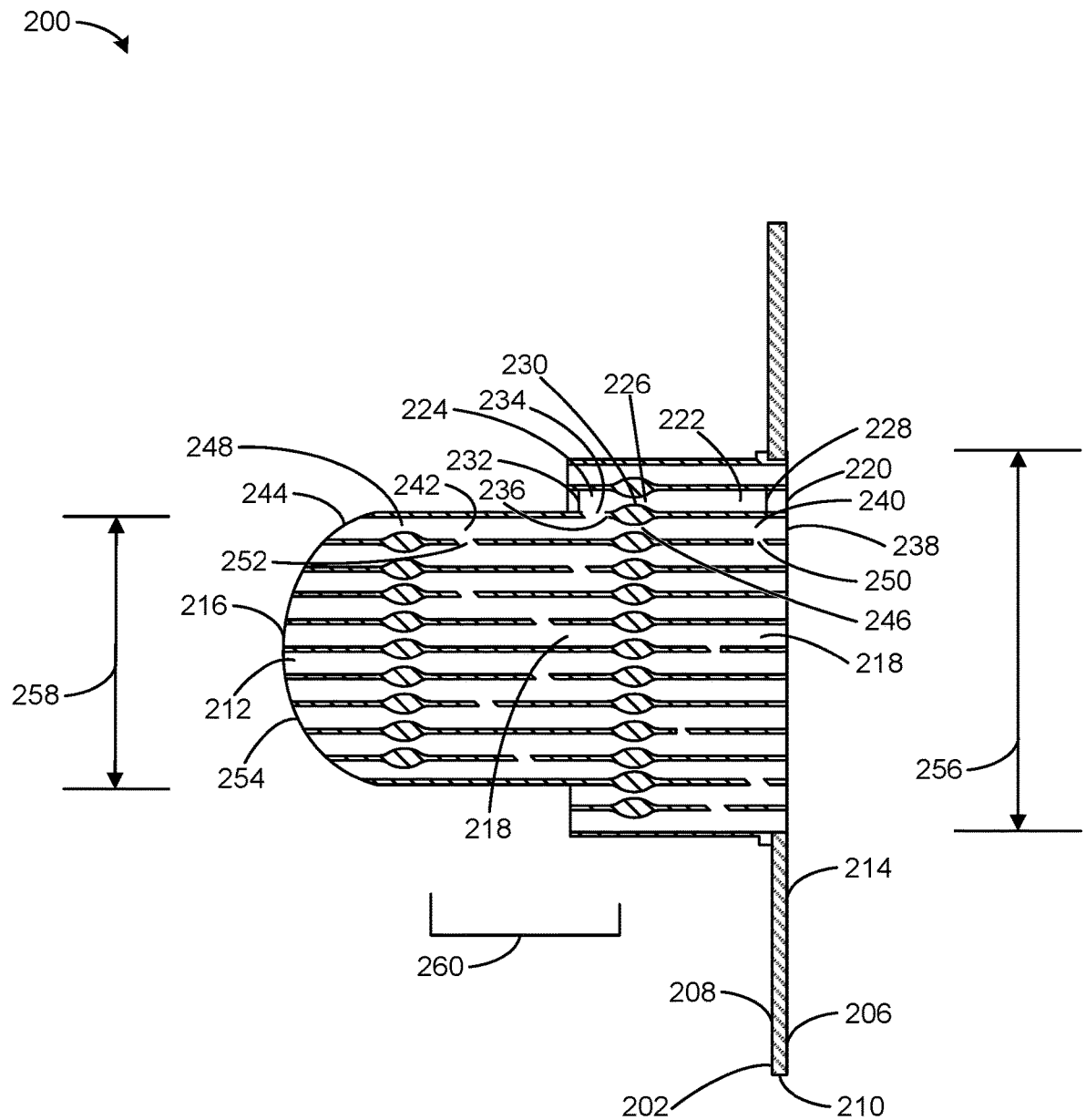

FIGS. 2A-2B illustrate an example valve trim 200 constructed in accordance with teachings of this disclosure. The valve trim 200 of the illustrated examples can be positioned inside the globe of a ball valve to replace the valve trim 122. In some examples, the valve trim 200 can be positioned between pipes, positioned between the valve body 102 and a pipe, and/or positioned within the valve body 102 (e.g., the second surface 208 abuts the first surface 124 of the valve body 102). In examples disclosed herein, the valve trim 200 is positioned in the fluid flow path 104. To position the valve trim 200 in the fluid flow path 104, the valve trim 200 includes an annular ring 202 having a first diameter that is smaller than a diameter of the valve body 102 and/or a pipe that is to be coupled to the valve body 102. As used herein, the term "substantially" implies approximately rather than perfectly. To couple the valve trim 200 to the valve body 102, the annular ring 202 includes openings 204 that can receive fasteners such as screws or flange bolts to couple the valve trim 200 directly to the valve body 102. In some examples, the annular ring 202 may be serrated to form a seal when positioned (e.g., compressed) between a pipe and the valve body 102.

Turning to FIG. 2B, the annular ring 202 of the illustrated example has a first surface 206 and a second surface 208. The first surface 206 is to abut a surface of a pipe and the second surface 208 is to abut a face of the valve body 102 (e.g., the first surface 124). The annular ring 202 has a thickness 210 that is sized to maintain the structural integrity of the valve trim 200 when the valve trim 200 is positioned in the fluid flow path 104. To reduce cavitation, noise, etc. in various types of valves and/or piping systems, the valve trim 200 includes a plurality of fluid passageways 212 that extend from a first end 214 of the valve trim 200 to a second end 216 of the valve trim 200. That is, when the valve trim 200 is positioned in the fluid flow path 104, the fluid passageways 212 extend from the inlet 106 to the outlet 108. Specifically, the fluid passageways 212 extend through the valve trim 200 to provide fluid communication between the inlet 106 and the outlet 108 when the valve trim 200 is coupled to the valve body 102. For example, in a closed position, the flow control member 110 blocks or prevents fluid flow through the fluid passageways 212. In an open and/or partially open position, the flow control member 110 allows fluid flow through some or all of the fluid passageways 212 and, thus, enables fluid flow between the inlet 106 and the outlet 108.

In the illustrated example, each of the fluid passageways 212 includes one or more anti-cavitation, and/or pressure staged passages 218 having various shapes, sizes, and/or spacing to control fluid flow and/or reduce or eliminate cavitation, and/or noise through the rotary valve 100. In examples disclosed herein, the pressure staged passages 218 have hexagonally shaped cross-sections to increase flow capacity as fluid flows from the inlet 106 to the outlet 108, or as fluid flows from the outlet 108 to the inlet 106 (e.g., fluid flows from the first side 214 to the second side 216). However, the pressure staged passages 218 and/or the fluid passageways 212 can be any shape to increase the flow capacity produced by the valve trim 200 as fluid flows through the fluid passageways 212. The pressure staged passages 218 may have cross-sections that are hexagonally shaped, diamond shaped, circular, ovular, polygonal and/or any other cross-sectional shape or profile and/or combination thereof, as discussed in more detail below in connection with FIGS. 3A-3C. The valve trim 200 can be formed via additive manufacturing (e.g., 3D Metal Printing, 3D Wax Printing, 3D Binder Jet Sand Mold Printing, etc.) to form a unitary structure (e.g., a unitary valve trim 200) including the fluid passageways 212 having one or more pressure staged passages 218. As used herein, the term "pressure staged passage" is used to refer to a portion of the fluid passageway 212 that includes a restriction (e.g., a throat) in the fluid passageway 212 on at least one end. As used herein, the term "throat" refers to a restricted channel and/or passageway that extends between a first pressure staged passage and a second pressure staged passage.

In the illustrated example, a first fluid passageway 220 includes a first pressure staged passage 222 and a second pressure staged passage 224. In the illustrated example, the first pressure staged passage 222 and the second pressure staged passage 224 are fluidly coupled via a throat 226. In some examples, the first pressure staged passage 222 has a first diameter 228, the throat 226 has a second diameter 230 smaller than the first diameter 228, and the second pressure staged passage 224 has a third diameter 232 larger than the first diameter 228. The throat 226 is depicted as a channel between the first and second pressure staged passages 222, 224 that is shaped and/or sized to provide a certain pressure drop as fluid flows through the fluid passageway 220. In the illustrated example, the first pressure staged passage 222 is fluidly coupled to an outer surface of the valve trim 200 to allow fluid to flow to the outlet 108. In some examples, the first pressure staged passage 222, the throat 226, and/or the second pressure staged passage 224, may have various geometries, sizes, and/or spacing to provide certain fluid flow characteristics and/or pressure drop characteristics, as discussed in more detail below in connection with FIGS. 3A-3C.

In the illustrated example, the second pressure staged passage 224 includes a first radial passageway 234. The radial passageway 234 is formed in a portion 236 of the first passageway 220 adjacent a second passageway 238. In the illustrated example, the second passageway 238 extends from the inlet 106 to the outlet 108 (e.g., from the first end 214 to the second end 216). The first radial passageway 234 fluidly couples the first passageway 220 to the second passageway 238. That is, the first radial passageway 234 allows fluid to flow from the first passageway 220 to the second passageway 238 when the flow control member 110 is in an open or partially-open position. The first radial passageway 234 facilitates radial communication of process pressure (e.g., maximizing recovery volume after each staged pressure drop) by allowing the entire valve trim 200 volume to be utilized while the flow control member 110 (e.g., a ball) of the rotary valve 100 is partially closed (e.g., partially preventing fluid from flowing through a portion of the valve trim 200).

In the illustrated example, the second passageway 238 includes a first pressure staged passage 240, a second pressure staged passage 242, and a third pressure staged passage 244. The first pressure staged passage 240 is fluidly coupled to the second pressure staged passage 242 via a first throat 246 to provide a certain pressure drop as fluid flows through the second passageway 238, and the second pressure staged passage 242 is fluidly coupled to the third pressure staged passage 244 via a second throat 248 to provide a certain pressure drop as fluid flows through the second passageway 238. In the illustrated example, the first pressure staged passage 240 includes a second radial passageway 250 and the second pressure staged passage 242 includes a third radial passageway 252. The second radial passageway 250 and the third radial passageway 252 allow radial communication of process pressure (e.g., maximizing recovery volume after each staged pressure drop) within the valve trim 200.

In the illustrated example, the valve trim 200 includes a convex surface 254 to be positioned in the concave surface 120 of the ball (e.g., the flow control member 110). The valve trim 200 has a first diameter 256 proximate the first end 214 to accommodate a first number of the fluid passageways 212 and a second diameter 258 proximate the second end 216 to reduce the number of the fluid passageways 212 to less than the first number to reduces noise, vibration and/or reduce or eliminate cavitation generated by fluid flowing through the rotary valve 100. The valve trim 200 includes a plurality of radial passageways (e.g., radial passageway 234) to fluidly couple the fluid passageways 212 to one another to maximize recovery volume.

In some examples, fluid may flow from the inlet 106 to the outlet 108 (e.g., from the second side 216 to the first side 214). As such, as fluid flows from the second side 216 to the first side 214, the valve trim 200 volume increases from the second diameter 258 to the first diameter 256 to increase the number of the fluid passageways 212 to greater than the first number. In some examples, the valve trim 200 only includes radial passageways 234 in a first pressure staged passage portion 260 of the valve trim 200 to fluidly couple the fluid passageways 212 to one another to maximize recovery volume.

Figure 3A:
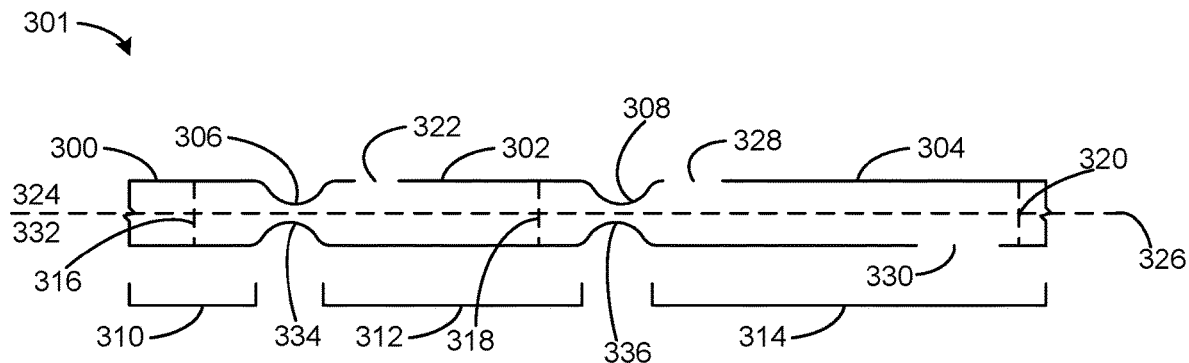
FIGS. 3A-3C are example fluid passageway structures constructed in accordance with teachings of this disclosure.
Figure 3B:
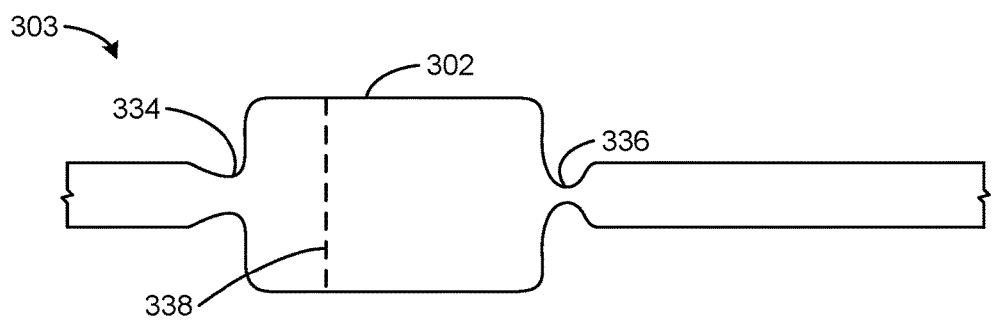
Figure 3C:
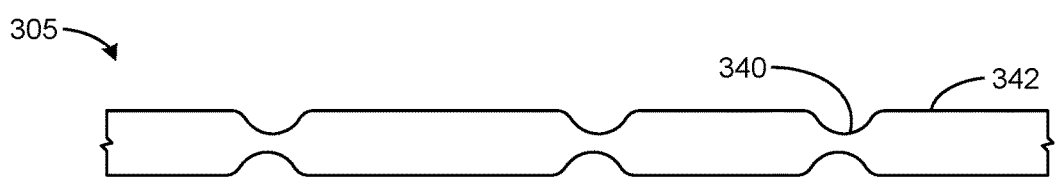

FIGS. 3A-3C are enlarged cross-sectional views of fluid passageways 301, 303, and 305 that may be used to implement the fluid passageways 212 of the example valve trim 200 of FIGS. 2A-2B. In the illustrated example of FIG. 3A, the fluid passageway 301 includes a first pressure staged passage 300, a second pressure staged passage 302, and a third pressure staged passage 304. The first pressure staged passage 300 is fluidly coupled to the second pressure staged passage 302 via a first throat 306, and the second pressure staged passage 302 is fluidly coupled to the third pressure staged passage 304 via a second throat 308. In the illustrated example of FIG. 3A, the first pressure staged passage 300 has a first length 310, the second pressure staged passage 302 has a second length 312 longer than first length 310, and the third pressure staged passage 304 has a third length 314 longer than the first and second lengths 310, 312. In the illustrated example of FIG. 3A, the first pressure staged passage 300 has a first diameter 316, the second pressure staged passage 302 has a second diameter 318, and the third pressure staged passage has a third diameter 320. In the example of FIG. 3A, the first, second and third diameters 316, 318, 320 are the same, but the diameters 316, 318, 320 may be sized based on desired flow capacity and/or recovery volume characteristics for the valve trim 200, as illustrated in FIG. 3B. The second pressure staged passage 302 includes a first radial passageway 322 on a first side 324 of a longitudinal axis 326, and the third pressure staged passage 304 includes a second radial passageway 328 on the first side 324 of the longitudinal axis 326, and a third radial passageway 330 on a second side 332 of the longitudinal axis 326.

In the illustrated example of FIG. 3A, the first throat 306 has a first throat diameter 334, and the second throat 308 has a second throat diameter 336. In the illustrated example, the first throat diameter 334 and the second throat diameter 336 are substantially similar, but may be sized based on a desired flow characteristic (e.g., optimize cavitation abatement capability, etc.) for the valve trim 200. The throats 306, 308

(e.g., a narrowed portion of the fluid passageway 212 between two wider portions of the fluid passageway 212), decreases the fluid pressure as the fluid approaches the throats 306, 308 and increases as the fluid exits the throats 306, 308. In such instances, the fluid velocity decreases when fluid exits the throats 306, 308 (e.g., a lowest-pressure value) to the subsequent wider portion (e.g., a highest-pressure value downstream from the throats 306, 308) of the pressure staged passages 300, 302, 304. The desired flow characteristics (e.g., enhanced flow capacity, reduction of noise and/or cavitation, etc.) are achieved by varying a number and/or a geometry of the pressure staged passages 300, 302, 304.

Turning to FIG. 3B, the fluid passageway 303 operates in the same manner as the fluid passageway 301 of FIG. 3A. However, in contrast to the fluid passageway 301 in FIG. 3A, the second pressure staged passage 302 has a fourth diameter 338 that is larger than the second diameter 318. In the illustrated example of FIG. 3B, the first throat diameter 334 is larger than the second throat diameter 336. FIG. 3C includes a third throat 340 following the third pressure staged passage 304 to form a fourth pressure staged passage 342.

Figure 4A:
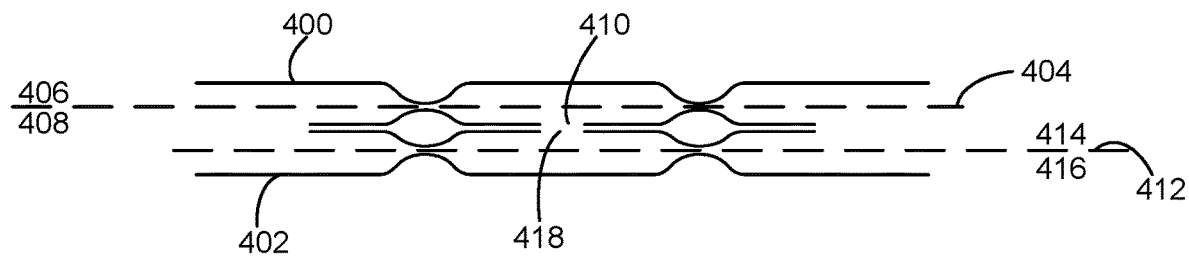
FIGS. 4A-4C are example fluid passageways constructed in accordance with teachings of this disclosure.
Figure 4B:
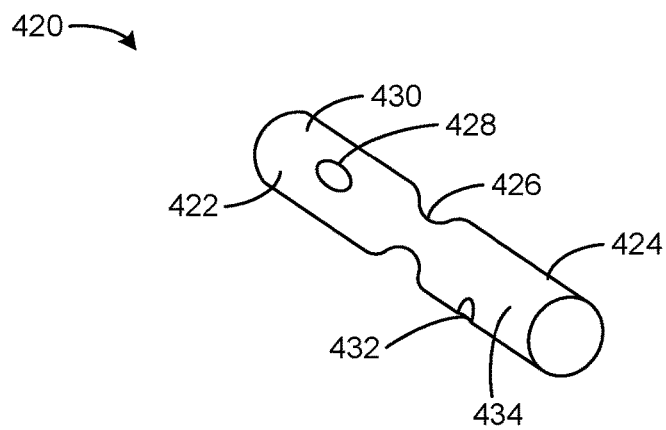
Figure 4C:
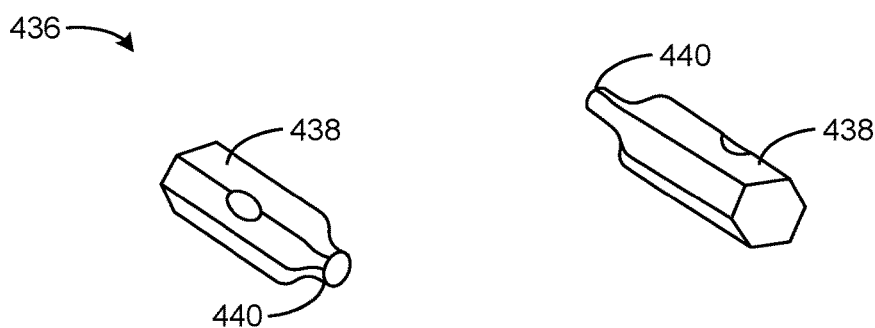

FIGS. 4A-4C are example fluid passageways constructed in accordance with teachings of this disclosure. In particular, FIG. 4A includes a first fluid passageway 400 and a second fluid passageway 402 adjacent the first fluid passageway 400. In the illustrated example, the first fluid passageway 400 includes a longitudinal axis 404 forming a first side 406 and a second side 408 of the fluid passageway 400. The first fluid passageway 400 of the illustrated example includes a radial passageway 410 on the second side 408 of the longitudinal axis 404. The second fluid passageway 402 includes a longitudinal axis 412 forming a first side 414 and a second side 416 of the second fluid passageway 402. The second fluid passageway 402 of the illustrated example includes a radial passageway 418 on the first side 414 of the longitudinal axis 412. As such, the first fluid passageway 400 and the second fluid passageway 402 are fluidly coupled via the first radial passageway 410 and the second radial passageway 418.

FIG. 4B illustrates an example fluid passageway 420 including a first pressure staged passage 422 and a second pressure staged passage 424 fluidly coupled via a throat 426. In the illustrated example, the first pressure staged passage 422 includes a first radial passageway 428 formed in a first surface 430 of the fluid passageway 420, and the second pressure staged passage 424 includes a second radial passageway 432 formed in a second surface 434 of the fluid passageway 420.

FIG. 4C illustrates an example fluid passageway 436 including a pressure staged passage 438 and a throat 440. In the illustrated example of FIG. 4C, the pressure staged passage 438 has a hexagonal cross-section and the throat 440 has a circular cross-section. That is, as fluid flows through the fluid passageway 436, the fluid enters the circular shaped throat 440 (e.g., from another adjacent fluid passageway), expands into the hexagonal shaped pressure staged passage 438, and proceeds to flow downstream, for example.

Figure 5A:
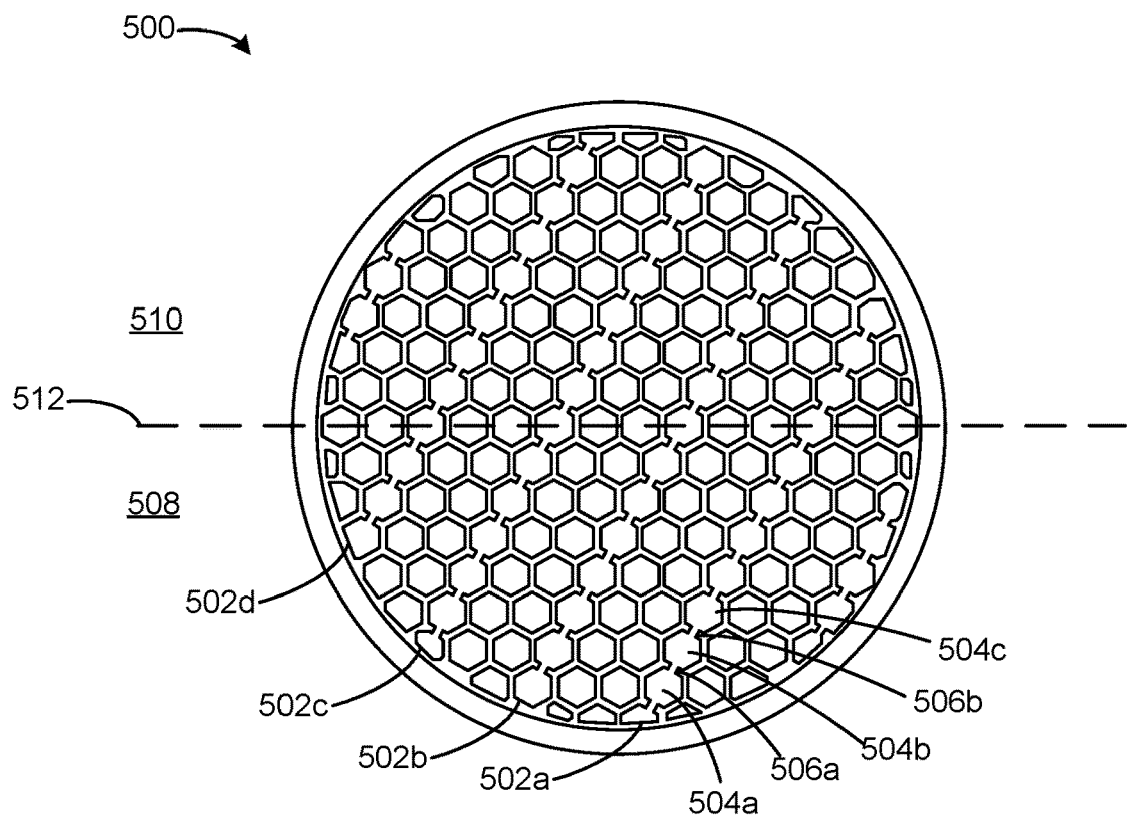
FIGS. 5A-5C are example radial passageway structures constructed in accordance with teachings of this disclosure.
Figure 5B:
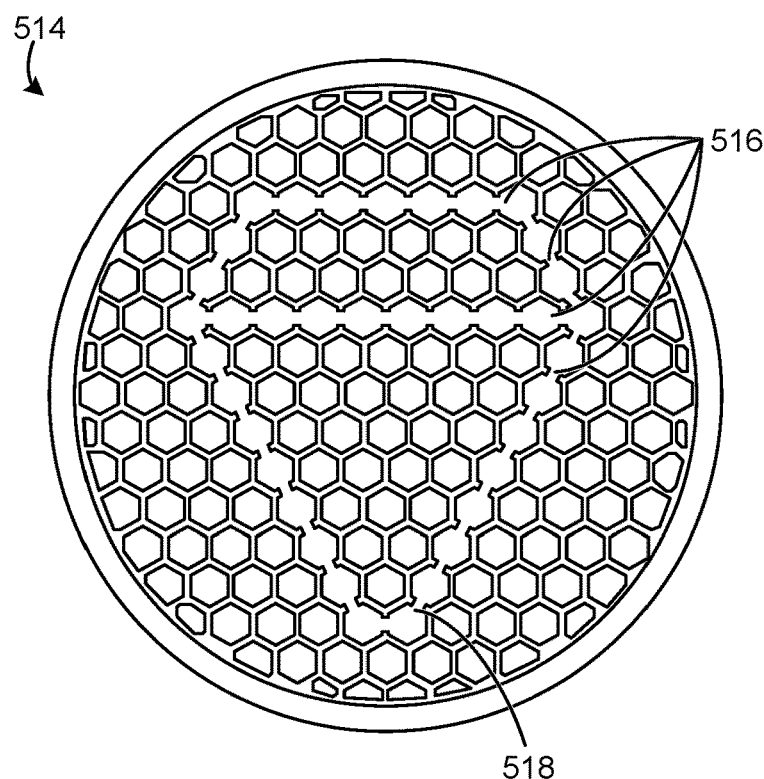
Figure 5C:
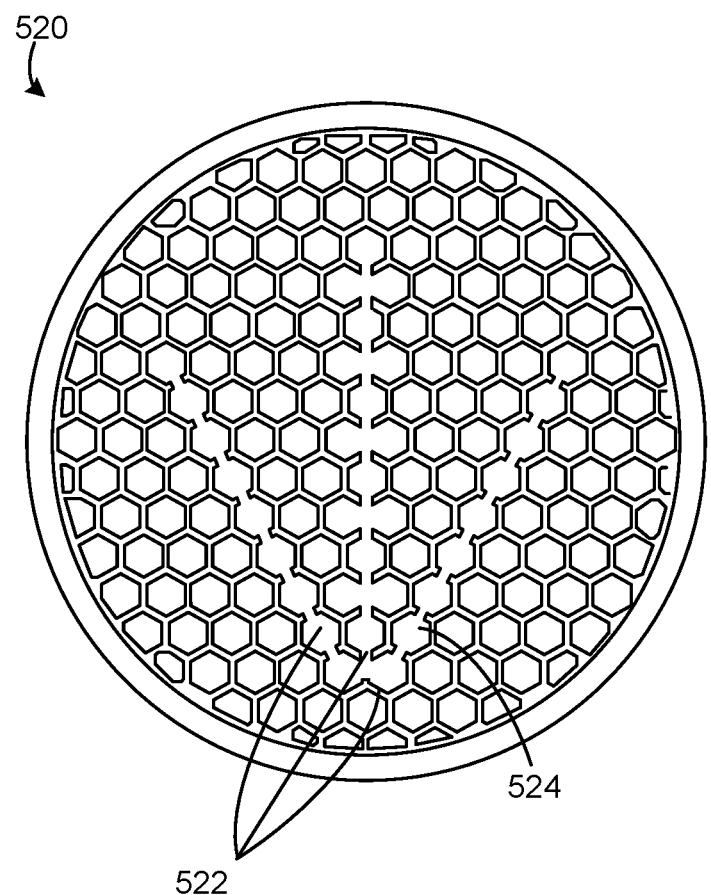

FIGS. 5A-5C are example radial passageway structures constructed in accordance with teachings of this disclosure. In particular, FIGS. 5A-5C are example cross sections of the valve trim 200 illustrating radial passageway paths extending through the valve trim 200. In the illustrated example of FIG. 5A, the valve trim 200 includes a first radial passageway structure 500 including a plurality of radial passageway paths 502a-d that fluidly couple a plurality of fluid passageways 504a-d (e.g., the fluid passageways 212 and/or pressure staged passages 218). In the illustrated example of FIG. 5A, a first fluid passageway 504a is fluidly coupled to a second fluid passageway 504b via a first radial passageway 506a. In a similar manner, the second fluid passageway 504b is fluidly coupled to a third fluid passageway 504c via a second radial passageway 506b. As such, the first fluid passageway 504a and the third fluid passageway 504c are fluidly coupled. As shown in the illustrated example of FIG. 5A, a first radial passageway path 502a includes a plurality of radial passageways (e.g., 506a, 506b . . . 506n) that extend from a first portion 508 of the valve trim 200 to a second portion 510 of the valve trim 200 separated by a dashed line 512.

The dashed line 512 of the illustrated example illustrates the closure member 110 in a partially closed position. That is, in a partially closed position, fluid flows through the fluid passageways 504 in the first portion 508 of the valve trim 200, but not through the fluid passageways 504 in the second portion 510. However, the radial passageways paths 502 extend from the first portion 508 to the second portion 510 and fluidly couple the fluid passageways 504 in the first portion 508 with the fluid passageways 504 in the second portion 510. That is, the radial passageway paths 502 enable increased flow capacity by utilizing a volume (e.g., a volume in the second portion 510) of the valve trim 200 when the closure member 110 is in a partially closed position (e.g., preventing fluid from flowing through the fluid passageways 504 in the second portion 510). In some examples, the fluid passageways 504 in the first portion 508 have a first number of pressure staged passages (e.g., a first number of throats), and the fluid passageways 504 in the second portion 510 have a second number of pressure staged passages different than the first number of pressure staged passages. For example, a fluid passageway 504 in the first portion 508 may have four pressure staged passages as illustrated in FIG. 3C, while a fluid passageway 504 in the second portion 510 may have three pressure staged passages as illustrated in FIG. 3A.

FIG. 5B illustrates another example radial passageways structure for the valve trim 200. In the illustrated example of FIG. 5B, the valve trim 200 includes a second radial passageway structure 514 including a plurality of radial passageway paths 516 that fluidly couple a plurality of fluid passageways 518. The radial passageway structure 514 of the illustrated example operates in a similar manner as the radial passageway structure 500 of FIG. 5A. However, in contrast to the radial passageway structure 500 of FIG. 5A, the second radial passageway structure 514 includes an alternative configuration of radial passageways.

FIG. 5C illustrates another example radial passageway structure for the valve trim 200. In the illustrated example of FIG. 5C, the valve trim 200 includes a third radial passageway structure 520 including a plurality of radial passageway paths 522 that fluidly couple a plurality of fluid passageways 524. The radial passageway structure 520 of the illustrated example operates in a similar manner as the radial passageway structures 500, 514 of FIGS. 5A-5B. However, in contrast to the radial passageway structures 500, 514 of FIG. 5A-5B, the third radial passageway structure 520 includes an alternative configuration of radial passageways.

From the foregoing, it will be appreciated that example apparatus have been disclosed that enable a valve trim to provide certain fluid flow characteristics and/or pressure drop characteristics to reduce cavitation in a control valve. Example valve trim have been disclosed that provide various pressure staged passages to control pressure drops and reduce cavitation. Furthermore, example valve trim have been disclosed that include radial passageways between each staged recovery volume (e.g., pressure staged passage) to facilitate radial communication of process pressure to maximize recovery volume after each staged pressure drop. The radial passageways disclosed herein reduce cavitation by allowing the entire valve trim volume to be utilized while a closure member (e.g., a ball) of a rotary valve is partially closed (e.g., partially preventing fluid from flowing through a portion of the valve trim).

The following paragraphs provide various examples of the examples disclosed herein.

Example 1 includes an apparatus including a valve body including a fluid flow path between an inlet and an outlet; valve trim positioned in the fluid flow path, the valve trim including a first passageway extending from the inlet to the outlet, the first passageway including a first pressure staged passage and a second pressure staged passage, the second pressure staged passage including a first radial passageway.

Example 2 includes the apparatus of example 1, wherein the first pressure staged passage is fluidly coupled to the second pressure staged passage via a throat.

Example 3 includes the apparatus of examples 1 or 2, wherein the first pressure staged passage has a first diameter, the throat has a second diameter smaller than the first diameter, and the second pressure staged passage has a third diameter larger than the first diameter.

Example 4 includes the apparatus of any of examples 1-3, wherein the first pressure staged passage has a hexagonal cross-section and the throat has a circular cross-section.

Example 5 includes the apparatus of any of examples 1-4, wherein the first radial passageway is formed in a portion of the first passageway adjacent a second passageway.

Example 6 includes the apparatus of any of examples 1-5, wherein the second passageway extends from the inlet to the outlet, the first radial passageway to fluidly couple the first passageway to the second passageway.

Example 7 includes the apparatus of any of examples 1-6, wherein the second passageway includes at least one of a third pressure staged passage, a fourth pressure staged passage, and a fifth pressure staged passage.

Example 8 includes the apparatus of any of examples 1-7, wherein the third pressure staged passage is fluidly coupled to the fourth pressure staged passage via a first throat, and the fourth pressure staged passage is fluidly coupled to the fifth pressure staged passage via a second throat.

Example 9 includes the apparatus of any of examples 1-8, wherein the third pressure staged passage includes a second radial passageway and the fifth pressure staged passage includes a third radial passageway.

Example 10 includes the apparatus of any of examples 1-9, wherein the valve trim is a unitary structure.

Example 11 includes an apparatus including a valve body including a fluid flow path between an inlet and an outlet; a ball positioned in the fluid flow path and operatively coupled to a shaft, the ball to maintain fluid flow between the inlet and the outlet; and valve trim positioned in the fluid flow path, the valve trim including a first passageway extending from a first end of the valve body to a second end of the valve body and a second passageway adjacent the first passageway extending from the first end to the second end, the first passageway fluidly coupled to the second passageway via a radial passageway.

Example 12 includes the apparatus of example 11, wherein the first passageway includes a first pressure staged passage, a second pressure staged passage, and a third pressure staged passage.

Example 13 includes the apparatus of examples 11 or 12, wherein the first pressure staged passage is fluidly coupled to the second pressure staged passage via a first throat, and the second pressure staged passage is fluidly coupled to the third pressure staged passage via a second throat.

Example 14 includes the apparatus of any of examples 11-13, wherein the second passageway includes a fourth pressure staged passage, a fifth pressure staged passage, and a sixth pressure staged passage.

Example 15 includes the apparatus of any of examples 11-14, wherein the fourth pressure staged passage is fluidly coupled to the fifth pressure staged passage via a third throat, and the fifth pressure staged passage is fluidly coupled to the sixth pressure staged passage via a fourth throat.

Example 16 includes the apparatus of any of examples 11-15, wherein the radial passageway is formed in a first side of a first longitudinal axis of the first passageway of the second pressure staged passage and a second side of a second longitudinal axis of the second passageway of the fifth pressure staged passage, the radial passageway to allow fluid to flow through the second passageway when the ball is in a partially closed position.

Example 17 includes the apparatus of any of examples 11-16, wherein the valve trim includes a first surface and a convex surface, the first surface to abut a first face of the valve body, the convex surface to be adjacent a concave surface of the ball.

Example 18 includes an apparatus including valve trim including fluid passageways extending from a first end to a second end, the fluid passageways including respective pressure staged passages that extend along the valve trim, the valve trim having a first diameter proximate the first end to accommodate a first number of the fluid passageways and a second diameter proximate the second end to increase the number of the fluid passageways to greater than the first number.

Example 19 includes the apparatus of example 18, wherein the fluid passageways are fluidly coupled to one another via a plurality of radial passageways.

Example 20 includes the apparatus of examples 18 or 19, wherein the fluid passageways are hexagonally shaped to increase flow capacity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a valve body including a fluid flow path between an inlet and an outlet; and
valve trim positioned in the fluid flow path, the valve trim including a first passageway extending from the inlet to the outlet, the first passageway including a first pressure staged passage and a second pressure staged passage, the second pressure staged passage including a first radial passageway, the first pressure staged passage fluidly coupled to the second pressure staged passage via a first throat, the first pressure staged passage has a hexagonal cross-section and the first throat has a circular cross-section.

2. The apparatus of claim 1, wherein the first pressure staged passage has a first diameter, the first throat has a second diameter smaller than the first diameter, and the second pressure staged passage has a third diameter larger than the first diameter.

3. The apparatus of claim 1, wherein the first radial passageway is formed in a portion of the first passageway adjacent a second passageway.

4. The apparatus of claim 3, wherein the second passageway extends from the inlet to the outlet, the first radial passageway to fluidly couple the first passageway to the second passageway.

5. The apparatus of claim 4, wherein the first passageway includes a third pressure staged passage.

6. The apparatus of claim 1, wherein the valve trim is a unitary structure.

7. An apparatus comprising:
a valve body including a fluid flow path between an inlet and an outlet; and
valve trim positioned in the fluid flow path, the valve trim including a first passageway extending from the inlet to the outlet, the first passageway including a first pressure staged passage and a second pressure staged passage, the second pressure staged passage including a first radial passageway, the first radial passageway formed in a portion of the first passageway adjacent a second passageway, the second passageway extending from the inlet to the outlet, the first radial passageway to fluidly couple the first passageway to the second passageway, the first passageway including a third pressure staged passage, the second pressure staged passage is fluidly coupled to the third pressure staged passage via a second throat.

8. The apparatus of claim 7, wherein the second passageway includes a fourth pressure staged passage, a fifth pressure staged passage, and a sixth pressure staged passage.

9. The apparatus of claim 8, wherein the fourth pressure staged passage is fluidly coupled to the fifth pressure staged passage via a third throat, and the fifth pressure staged passage is fluidly coupled to the sixth pressure staged passage via a fourth throat.

10. The apparatus of claim 9, wherein the first radial passageway is formed in a first side of a first longitudinal axis of the first passageway of the second pressure staged passage and a second side of a second longitudinal axis of the second passageway of the fifth pressure staged passage, the first radial passageway to allow fluid to flow through the second passageway when a ball positioned in the fluid flow path to maintain fluid flow between the inlet and outlet is at least partially preventing fluid from flowing through the second passageway.

11. The apparatus of claim 10, wherein the valve trim includes a first surface and a convex surface, the first surface to abut a first face of the valve body, the convex surface to be adjacent a concave surface of the ball.

12. The apparatus of claim 8, wherein the fourth pressure staged passage includes a second radial passageway and the fifth pressure staged passage includes a third radial passageway.

13. The apparatus of claim 12, wherein the second radial passageway is to fluidly couple the first passageway to the second passageway.

14. The apparatus of claim 12, wherein the third radial passageway is formed in a portion of the second passageway adjacent a third passageway.

15. An apparatus comprising:
valve trim including fluid passageways extending from a first end to a second end, the fluid passageways including respective pressure staged passages that extend along the valve trim, the valve trim having a first diameter proximate the first end to accommodate a first number of the fluid passageways and a second diameter proximate the second end to increase the number of the fluid passageways to greater than the first number.

16. The apparatus of claim 15, wherein the fluid passageways are fluidly coupled to one another via a plurality of radial passageways.

17. The apparatus of claim 16, wherein the fluid passageways are hexagonally shaped to increase flow capacity.

18. An apparatus comprising:
a valve body including a fluid flow path between an inlet and an outlet; and
valve trim positioned in the fluid flow path, the valve trim including a first passageway extending from the inlet to the outlet, the first passageway including a first pressure staged passage and a second pressure staged passage, the second pressure staged passage including a first radial passageway, the valve trim includes a first diameter proximate the inlet and a second diameter proximate the outlet, the second diameter larger than the first diameter.

* * * * *